US008620269B2

(12) United States Patent
Johar et al.

(10) Patent No.: US 8,620,269 B2
(45) Date of Patent: Dec. 31, 2013

(54) DEFINING A BOUNDARY FOR WIRELESS NETWORK USING PHYSICAL ACCESS CONTROL SYSTEMS

(75) Inventors: Manoj Johar, Bangalore (IN); Venkatesh Viswanathan, Bangalore (IN)

(73) Assignee: Honeywell International Inc., Morristown, NJ (US)

( * ) Notice: Subject to any disclaimer, the term of this patent is extended or adjusted under 35 U.S.C. 154(b) by 1340 days.

(21) Appl. No.: 12/020,270

(22) Filed: Jan. 25, 2008

(65) Prior Publication Data

US 2009/0168695 A1 Jul. 2, 2009

Related U.S. Application Data

(60) Provisional application No. 61/017,980, filed on Dec. 31, 2007.

(51) Int. Cl.
| H04M 1/66 | (2006.01) |
| H04M 3/00 | (2006.01) |
| H04W 24/00 | (2009.01) |
| H04L 9/32 | (2006.01) |
| H04L 29/06 | (2006.01) |
| G06F 7/04 | (2006.01) |

(52) U.S. Cl.
USPC ........ 455/411; 455/418; 455/456.3; 713/168; 713/155; 726/4; 726/5; 370/338

(58) Field of Classification Search
USPC ............. 455/404.2, 26.1, 410–411, 418–420, 455/456.1–456.6, 414.1–414.2; 370/328, 370/338; 713/155, 168; 726/1–5
See application file for complete search history.

(56) References Cited

U.S. PATENT DOCUMENTS

| 7,212,828 | B2 | 5/2007 | Hind et al |
| 2003/0005326 | A1* | 1/2003 | Flemming ..................... 713/201 |
| 2005/0136892 | A1 | 6/2005 | Oesterling et al. |
| 2007/0094716 | A1* | 4/2007 | Farino et al. ..................... 726/5 |
| 2007/0186106 | A1* | 8/2007 | Ting et al. ..................... 713/168 |

FOREIGN PATENT DOCUMENTS

| WO | WO 2006/039119 A1 | 4/2006 |
| WO | WO 2007/050481 A2 | 5/2007 |
| WO | WO 2007/056383 A1 | 5/2007 |

OTHER PUBLICATIONS

Extended European Search Report corresponding to Application No. EP 08 17 2313, dated Dec. 2, 2010.

\* cited by examiner

*Primary Examiner* — Vladimir Magloire
*Assistant Examiner* — Michael Mapa
(74) *Attorney, Agent, or Firm* — Husch Blackwell

(57) ABSTRACT

A system and method for defining a boundary within a wireless coverage area using a physical access control system (PACS) and limiting access to the wireless network to devices located within the boundary area is provided. The system includes a PACS for controlling access to a secured area defined by the boundary to authorized personnel and a wireless network generating system for generating a wireless network. Access to the wireless network is limited to devices associated with an authorized personnel when the authorized personnel is determined to be within the secured area and denied to devices associated to personnel determined to be outside the secured area.

9 Claims, 3 Drawing Sheets

DEFINING A BOUNDARY FOR WIRELESS NETWORK USING PHYSICAL ACCESS CONTROL SYSTEMS

CROSS REFERENCE TO RELATED APPLICATION

The present application claims benefit of U.S. Provisional Application No. 61/017,980 filed on Dec. 31, 2007.

I. FIELD OF THE INVENTION

The present invention relates generally to wireless networking and more specifically to defining a boundary for a wireless network.

II. BACKGROUND OF THE DISCLOSURE

Wireless networks have become a popular way of establishing a network infrastructure in established homes and business. In the past, networking infrastructures needed to be hardwired into the home or business by running network cables, such as coaxial, twisted pair, etc., from a server, or modem, to one or more personal computers, workstations or network printers. Once established the wired network works well, however if more network equipment needs to be added or equipment is moved to different locations, the cables will need to be re-run to the new locations, resulting in a large expenditure of time and cost.

In contrast, once a wireless infrastructure is established in a premises, adding new network equipment is simply a matter of a software configuration. As for moving equipment, this poses no problem for a wireless network. In fact, someone using a laptop connected to a wireless network is free to move about the wireless coverage area without experiencing any changes or problems.

Depending on the actual wireless networking protocol used, whether IEEE 802.11a, IEEE 802.11b, IEEE 802.11g, IEEE 802.11n or any other future standard, the coverage range and transmission speeds will vary. Thus, by selecting the appropriate protocol and number of access point devices and routers, a wireless network can be created that will provide coverage across any size enclosure. Wireless coverage can even be established across entire cities, as many cities are presently planning. However, while the wireless coverage area can easily be expanded by adding additional access points at proper locations, no easy way is provided for limiting coverage area.

For example, a single 802.11g access point establishes a coverage area of approximately a 30 meter radius centered on the position of the access point. However, obstacles in the coverage area, such as cement or stone walls and metal surfaces, will attenuate or even block some of the signal. There is currently no easy way to adjust the coverage area short of building a boundary enclosure of a blocking material. Additionally, windows are nearly transparent to the wireless signal, thus the coverage of the access point can often times extend beyond the boundaries of a home or business in which it is established.

Leakage of the wireless network signal beyond the bounds of a home or business can lead to a host of security problems. Unauthorized users can easily and clandestinely connect to the wireless network for purposes ranging from innocuous, such as obtaining internet access, to malicious, such as theft of personal/corporate information.

Wireless networking protocols do provide some protection by way of password requirements for connecting to the network and MAC address filtering, which in theory prevents computers having a MAC address that is not preauthorized by the network administrator from connecting to the network. Other strategies employed by network administrators include configuring the wireless network such that it does not advertise itself to wireless devices. Thus unless someone is aware of the network's existence and the ID of the network, the network would not be accessed.

These strategies have drawbacks that limit their usability and/or effectiveness. In the case of a password, software exists that allows a hacker to crack most any commercial-grade password given enough time and computing power. Additionally, the password may be intercepted when it is broadcast between the authorized user and the wireless network.

MAC address filtering can be subverted using software that mimics a user defined MAC address in place of the actual MAC address assigned to the user's computer. Moreover, using MAC address filtering can pose an annoyance to both authorized users and network administrators in that each time a new network device is added to the network, its MAC address needs to be added to the filter list. Consequently, if a network card is replaced or if an authorized user attempts to use a previously unlisted network device, the connection to the wireless network will be rejected until such time as the new device is added to the MAC address filter list.

Essentially, if access to the wireless network signal is given to someone with malicious intent, any method of securing the network is made more difficult. The best way to secure a wireless network then, is to prevent wireless network signals from leaking beyond the boundaries in which it is to be utilized, thus requiring the hacker to be within a home, office, warehouse or other structure in which the wireless network is established. In this way, securing the wireless network becomes simply an extension of the physical security of the premises in which it covers.

Force Field (http://www.forcefieldwireless.com) provides a commercial paint-based solution (DefendAir™), either as a paint additive or as a premixed paint. DefendAir™ is designed to block radio waves up to 2.6 GHz frequencies, perfect for blocking 802.11b/g WiFi, Bluetooth, and some WiMax transmissions, and 5 GHz 802.11a signals. There is another similar paint-based solution offered by EM-SEC Technologies as well.

However, the solutions provided by Force Field and EM-SEC Technologies require extensive modification to an existing office space, namely the entire perimeter of the space needs to be coated with the paint. Even the floors may need to be coated if they are not constructed of signal blocking materials.

Presently, there is a need for limiting access to personnel within a defined boundary of a wireless network that is easily implemented using pre-existing devices.

III. SUMMARY OF THE DISCLOSURE

The present invention uses one or more existing physical access control systems (PACS) to limit access to private wireless networks. PACS have security event management information systems that provide information on the physical location of employees within an office or building. Each employee has an associated security ID, which is used to gain access to the physical premises by way of the PACS. Additionally, employees may be required to use their security ID when leaving the premises as well. Thus, by tracking the usage of the security ID, the PACS can easily determine if an employee is within the premises. Wireless devices owned by employees can be mapped to the employee's security ID. This helps in determining if the wireless device is within the valid boundary. Policies are deployed on the wireless network that make decisions based on this defined boundary and employee location information. For example, the policy utilizes the mapping to retrieve the corresponding security ID. Then a check is done to ensure that this security ID (user) is currently within the premises of the commercial site. Only if this check succeeds, access to the private network is issued. If the check with the PACS fails, the user is not allowed to login to the private network. This effectively restricts the range of the wireless network to the confines of the commercial site.

An exemplary embodiment of the present invention for defining a boundary for a wireless network includes a wireless network access device for creating a wireless network having a coverage area of arbitrary size; at least one access control for associating one or more devices capable of connecting to the wireless network with an owner; a physical access control unit for determining whether the owner associated with the one or more devices is within a secured area disposed within the coverage area; and a network controller for only allowing access to the wireless network to one or more devices associated with the owner when the owner is located within the secured area.

Another embodiment of the present invention for defining a boundary for a wireless network includes the steps of generating a wireless network having a coverage area in which wireless devices can receive a wireless signal; reading a identification prior to allowing personnel entry or egress from a secured area disposed within the coverage area; updating a list of personnel to reflect current personnel located within the secured area; receiving a network connection request from a device connectable to the wireless network; identifying an owner associated with the device; comparing the owner against the list of personnel to determine whether the owner is located within the secured area; allowing the network connection request only to the device associated with the owner when the owner is located within the secured area; and denying the network connection request to unassociated devices.

IV. BRIEF DESCRIPTION OF THE DRAWINGS

These and other features, aspects, and advantages of the present invention will become better understood with regard to the following description, appended claims, and accompanying drawings wherein:

V. DETAILED DESCRIPTION OF DISCLOSURE

Figure 1:
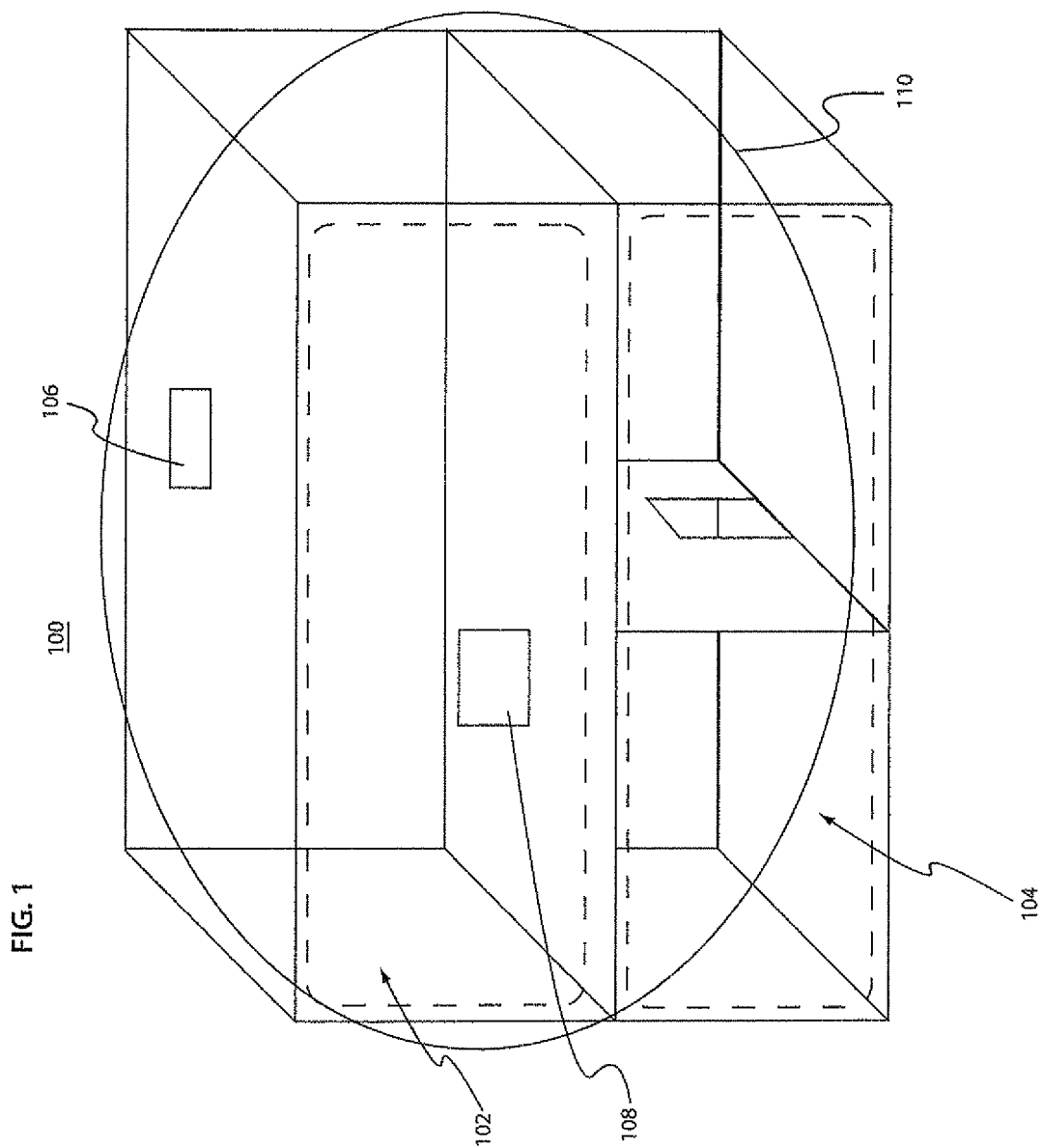
FIG. 1 illustrates a representation of a commercial structure in which an embodiment of the present invention is utilized.

Referring to FIG. 1 a representation of an office building 100 is shown. The office building 100 is divided into several offices 102, 104. A first office 102 contains a wireless network generated by a wireless device 106 such as an access point or router. The range of the wireless signal 110 emanating from the wireless device 106 overlaps the area defined as the first office 102 as well as a portion of the area defined as a second office 104. Additionally, the wireless signal 110 is present beyond the confines of the office building 100.

Moreover, the first office is equipped with a physical access control system (PACS) 108. PACS 108 are systems used to limit access to a physical location. Such PACS 108 contemplated in the present invention includes but are not limited to, RFID readers, retinal scanners, fingerprint scanners, ID card readers, voice identification, etc. PACS 108 include a scanner or reader for receiving the identification of an employee or other authorized personnel; a controller for verifying the employee identification and maintaining a record of employees currently located within a monitored space—in the case of FIG. 1 this monitored space is the first office 102. PACS 108 are generally connected to an electronic or magnetic lock disposed on a entry point thus preventing unauthorized personnel from entering the monitored space. However, in the case of an RFID system, the space may be monitored without the need for a physical barrier. Also, it is beneficial to the present invention if the PACS 108 tracks when an employee leaves the monitored space so that computers or other wireless devices registered to that employee cannot access the wireless network after the employee has left the premises.

The PACS 108 and wireless device 106 are in communication with each other by way of either a wireless or wired network connection between the wireless device 106 and the controller of the PACS 108. The communication between the PACS 108 and wireless device 106 is utilized by the wireless device 106 to determine whether an employee is within the authorized area before allowing a connection between the wireless device 106 and a wireless-enabled computer, PDA or other device registered to the employee.

Figure 2:
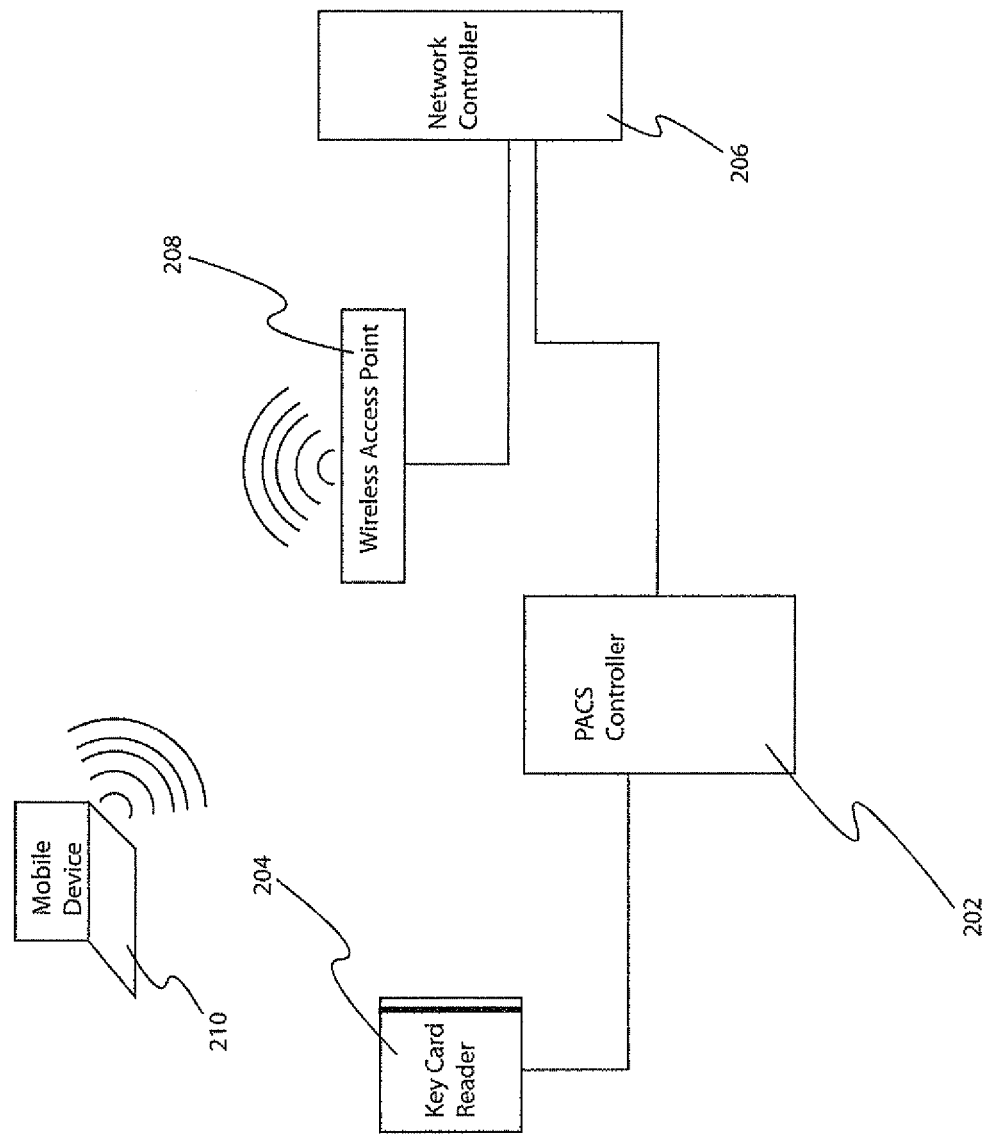
FIG. 2 illustrates a block representation of an embodiment of the present invention.

Referring to FIG. 2, a block diagram is provided showing the major components of an embodiment of the present invention. Specifically, the system in the present embodiment has a PACS controller 202, at least one ID reader such as a keycard reader 204, RFID reader, fingerprint scanner, retinal scanners, etc., a network controller 206 and a wireless access point 208. The function of the individual components will be described in further detail below.

The PACS controller 202 maintains a list or database of employees and corresponding identification information for verifying the identification of the employee upon entering a secured area. The type of identification information stored on the controller is dependent on the types of ID readers employed by the system. For example, a keycard reader would necessitate that the PACS controller 202 associate the information held in the keycards with individual employees, while fingerprint or retinal scanning devices would require that biometric data, i.e. fingerprint or retinal print data, is associated with the employees.

In operation, the PACS controller 202 receives identification information from the ID reader when an employee uses the ID reader to enter the premises. The identification information is then matched to a list of employees and the PACS controller determines whether the employee has access privileges to the premises, as some employees may have access to one area but not to another area of an office. If the employee has access privileges to the area, the PACS controller 202 actuates a lock thus allowing the employee to enter. If the employee does not have access privileges to the area, the PACS controller 202 performs an alternative function, such as provide a warning to the employee and/or not actuate the lock.

The network controller 206 includes a security section, which controls access to a network by requiring passwords, and/or other security credentials. The functions of the security section may be shared between the network controller 206 and the wireless access point 208 depending on the specific authentication protocols used. For example, MAC address filtering may be implemented on the wireless access point 208 while username/password authentication may be provided through the network controller 206. In addition, the security section receives information from the PACS controller 202 regarding the entrance or exit of individual employees into specific secured areas.

Thus, when an employee attempts to connect to a network using a mobile device 210, the wireless access point 208 verifies that the employee is within the secured area by checking with the network controller 206 and/or PACS controller 202 regarding which employees are currently within the secured area. Several ways for performing this are envisioned as embodiments of the present invention as well as other methods that would be apparent to one skilled in the art in light of this disclosure.

For example, if the system uses MAC address filtering, the MAC address of the mobile device 210 is entered into a database of known device and associated with an employee. Each employee may have any number of such mobile device 210 associated with him or her, such as wireless PDA, laptop computer, wireless enabled mobile telephone, etc. Any one or more of these devices may be allowed to connect to the wireless network only when the employee is within the defined security area. By comparing the MAC address database with the list of employees currently in the secured area, access can be granted or denied. For added security, attempts made by employees from outside the secured area can be logged for future reference and review by security personnel.

Upon exit of an employee from the secured area, which ideally would necessitate use of the ID reader 204 by the employee, the PACS controller 202 notifies the security section that an employee has exited the area. This notification can be used to disconnect any mobile devices associated with the employee that has exited the area. In this way, the employee will not be able to access the network once he has exited the area.

Figure 3:
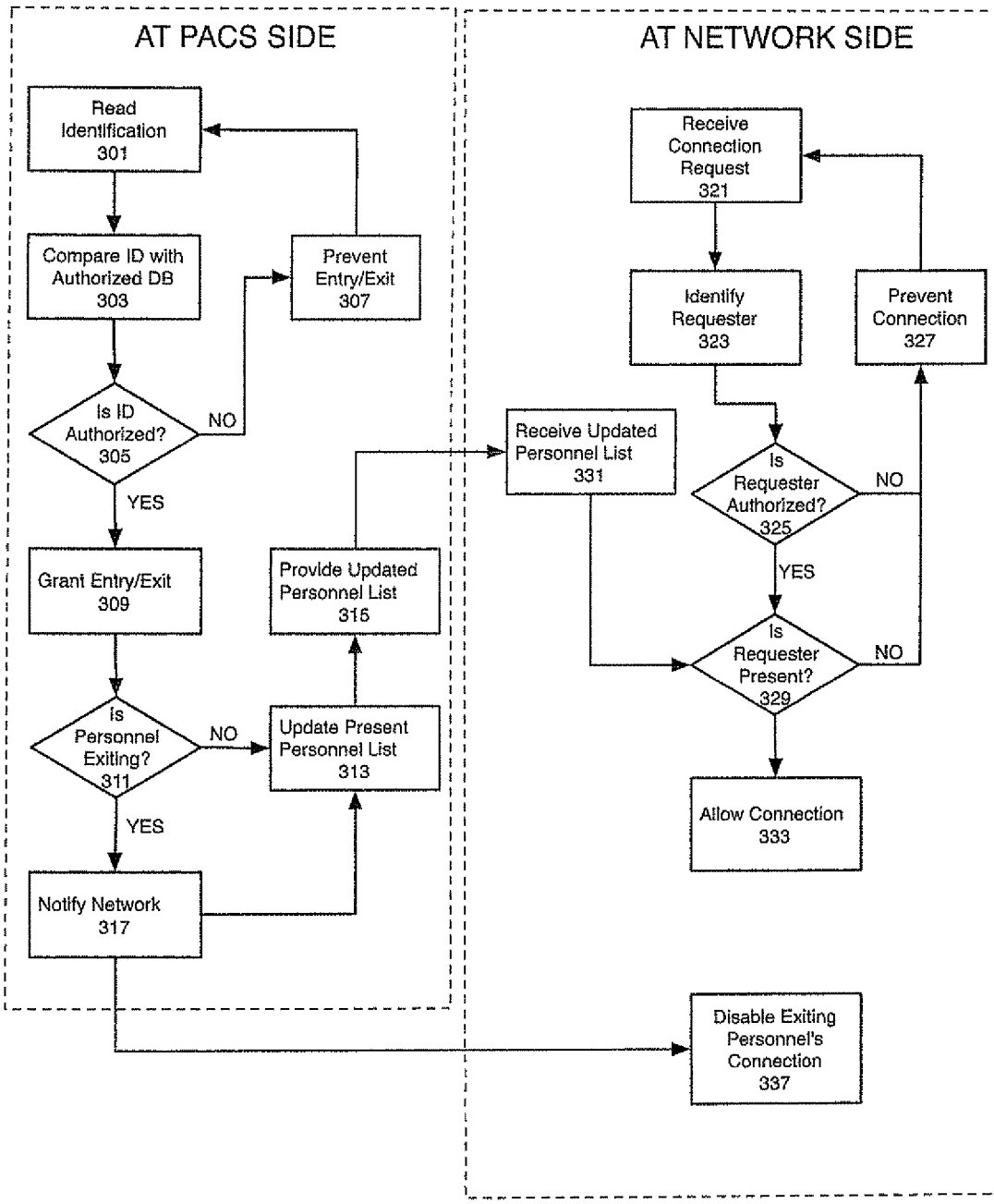
FIG. 3 illustrates a flow diagram of the process for performing an embodiment of the present invention.

Referring to FIG. 3, a flow diagram is shown representing the steps for performing an embodiment of the present invention. The method is separated into two parts, the steps performed on the PACS side and the steps performed on the network side. The two sets of steps occur simultaneously and separately for the most part. Beginning with the attempted entrance/exit of an employee into or out of a secured area, an ID reader reads the identification information of the employee in step 301. This read identification information is compared or looked up in a database or listing of personnel authorized to enter the secured area in step 303. If, in step 305, it is determined that the employee is not authorized to enter/exit the area, the process branches to step 307 where entry/exit is prevented. Additional actions may be taken at this point as well, for example a warning may be issued to the person seeking entrance, a notification my be sent to security personnel, etc.

On the other hand, if, in step 305, it is determined that the employee is authorized to enter/exit the area, the process continues to step 309 where entry/exit is granted, by for example actuating a locking mechanism of a door. The method then proceeds to step 311 where the PACS determines whether the employee was entering or exiting the area. This can be easily accomplished based on the side of the entrance that the ID reader is located, as well as other techniques.

If, in step 311, it is determined that the employee is entering the area, the process branches to step 313 where a list of personnel or employees present in the area is updated to include the new employee. This updated list is provided to the network side in step 315. However, if, it is determined in step 311 that the employee is exiting the area, the process continues to step 317 where the network side is notified of the exit. This notification is received by the network side in step 337, where any active network connections associated with the exiting employee are disabled. After the notification, the process continues to step 313, where the list of present personnel is updated, this time by removing the employee that exited the area from the room. This updated list is then provided to the network side in step 315.

Turning now to the network side, when someone requests to connect a mobile device to the network of the present invention in step 321, the identity of the requester is received, by way of a MAC address and/or username/password for example in step 323. In step 325 it is determined if the requester is authorized to connect to the network. If it is determined that the requester is not authorized to connect to the network, the process branches to step 327 where the connection is prevented. Additional actions may be taken at this point as well, for example a warning may be issued to the requester, a notification my be sent to security personnel, etc.

However, if it is determined that the requester is not authorized to connect to the network, the process continues onto step 329 where a determination is made regarding whether the requester is located within the secured area or not. The determination is made using the updated present personnel list received in step 331. If the determination is made in step 329 that the requester is not within the secured area, the process proceeds to step 327 where the connection is prevented.

On the other hand, if the determination is made in step 329 that the requester is located within the secured area, the process proceeds to step 333 where the connection is allowed.

The described embodiments of the present invention are intended to be illustrative rather than restrictive, and are not intended to represent every embodiment of the present invention. Various modifications and variations can be made without departing from the spirit or scope of the invention as set forth in the following claims both literally and in equivalents recognized in law.

What is claimed is:

1. A system for defining a boundary for a wireless network, said system comprising:
    a wireless network access device using media access control (MAC) filtering for creating a wireless network having a coverage area of arbitrary size;
    at least one access control for associating one or more devices capable of connecting to said wireless network with an owner by mapping the MAC address of the one or more devices to said owner;
    a physical access control unit for determining whether said owner associated with said one or more devices is within a secured area disposed within said coverage area; and
    a network controller for only allowing access to said wireless network to one or more devices associated with said owner when said owner is located within said secured area, wherein the physical access control unit maintains a list of owners within said coverage area, updates said list when an owner enters or exits said coverage area, and, when said list is updated, automatically provides an updated list of owners within said coverage area to said network controller, the wireless network access device receives an access request including the MAC address of the device, the wireless network access device checks via the list to ensure that owner mapped to the requesting device is within the secured area, grants access upon determining that the owner is within the list and denies access upon determining that the owner is not on the list.

2. The system as in claim 1, wherein said network controller utilizes a MAC address of said one or more devices to associate said one or more devices with said owner.

3. The system as in claim 1, wherein said physical access control unit further comprises at least one user identification reading device.

4. The system as in claim 3, wherein said at least one user identification reading device is selected from a group consisting of: RFID reader, keycard reader, fingerprint scanner, and retinal scanner.

5. A method for defining a boundary for a wireless network, said method comprising:
   generating a wireless network using MAC filtering and having a coverage area in which wireless devices can receive a wireless signal;
   reading identification prior to allowing personnel entry or egress from a secured area disposed within said coverage area;
   updating a list of personnel to reflect current personnel located within said secured area;
   when the list of personnel is updated, automatically providing an updated list of personnel to a network controller;
   receiving a connection request from a device connectable to said wireless network including the MAC address of the device;
   identifying an owner associated with said device by mapping the MAC address to the owner;
   comparing said owner against said updated list of personnel to determine whether said owner is located within said secured area;
   allowing said connection request only to said device associated with said owner when said owner is located within said secured area; and
   denying said network connection request to unassociated devices.

6. The method as in claim 5, wherein said reading is performed by at least one user identification reading device.

7. The method as in claim 6, wherein said at least one user identification reading device is selected from a group consisting of: RFID reader, keycard reader, fingerprint scanner, and retinal scanner.

8. The method as in claim 5, further comprising the step of notifying when said owner exits said secured area.

9. The method as in claim 5, further comprising the step of disconnecting said device from said wireless network when said owner exits said secured area.

* * * * *